United States Patent [19]

Yoshida et al.

[11] 4,170,785

[45] Oct. 9, 1979

[54] VIDEO SIGNAL REPRODUCING APPARATUS WITH ELECTRON BEAM SCANNING VELOCITY MODULATION

[75] Inventors: Susumu Yoshida, Naritanishi; Yoshio Ishigaki, Tokyo; Kinya Shinkai, Yokohama; Takao Tsuchiya, Fujisawa, all of Japan

[73] Assignee: Sony Corporation, Tokyo, Japan

[21] Appl. No.: 854,398

[22] Filed: Nov. 23, 1977

[30] Foreign Application Priority Data

Nov. 30, 1976 [JP] Japan .................................. 51-144565

[51] Int. Cl.² .......................... H04N 5/68; H04N 5/14
[52] U.S. Cl. ....................................... 358/242; 358/166
[58] Field of Search ................. 358/242, 166, 162, 64, 358/37

[56] References Cited

U.S. PATENT DOCUMENTS

| | | | |
|---|---|---|---|
| 3,936,872 | 2/1976 | Miyaoka | 358/242 |
| 4,080,628 | 3/1978 | Jirka | 358/166 |

OTHER PUBLICATIONS

Yoshida, Ohkoshi, and Shinkai, "Achievement of High Picture Quality in Color CRTs with Beam-Scan Velocity Modulation Method", *IEEE Transactions on Consumer Electronics*, vol. CE-23, No. 3, Aug. 1977, pp. 366-373.

*Primary Examiner*—John C. Martin
*Attorney, Agent, or Firm*—Lewis H. Eslinger; Alvin Sinderbrand

[57] ABSTRACT

In a video signal reproducing apparatus having a cathode ray tube in which at least one electron beam is made to scan a screen in line-scanning and vertical directions while the intensity of the beam is modulated to establish the brightness of a video picture to be displayed on the screen, and in which bright picture portions are represented by respective high level portions of a video signal defined between rising and falling edges extending from low level signal portions representing contiguous dark picture portions; a waveshaping circuit receives the video signal and acts thereon to provide a compensated video signal in which the width of each high level portion between the respective rising and falling edges is increased, the compensated video signal is employed to control the intensity of the electron beam, the rising and falling edges of each high level portion of the video signal are detected to provide a beam velocity modulation signal with respective positive and negative peaks by which the scanning velocity of the beam in the line-scanning direction is modulated, and the positions of such positive and negative peaks are shafted, relative to the corresponding peaks of a differentiation of the video signal, in the directions toward the adjacent low level signal portions of the compensated video signal.

15 Claims, 29 Drawing Figures

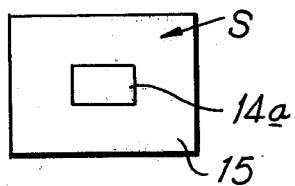
FIG. IA
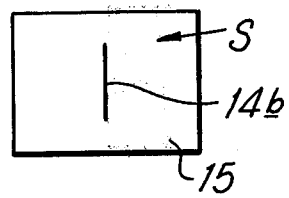
FIG. IB
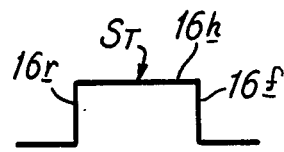
FIG. 2A
PRIOR ART
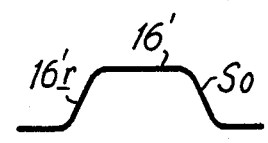
FIG. 2B
PRIOR ART
FIG. 2C
PRIOR ART
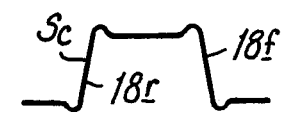
FIG. 2D
PRIOR ART
FIG. 3A
PRIOR ART
FIG. 3B
PRIOR ART
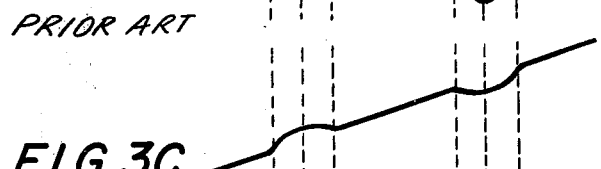
FIG. 3C
PRIOR ART
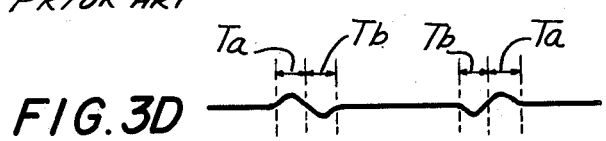
FIG. 3D
PRIOR ART
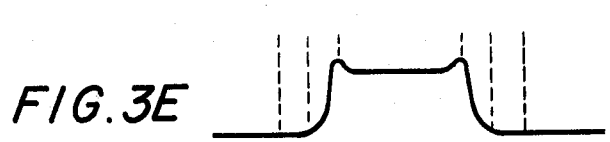
FIG. 3E
PRIOR ART

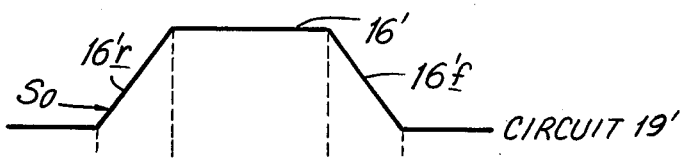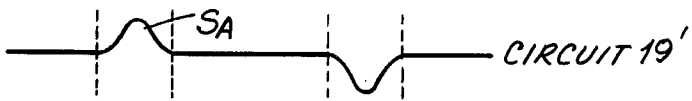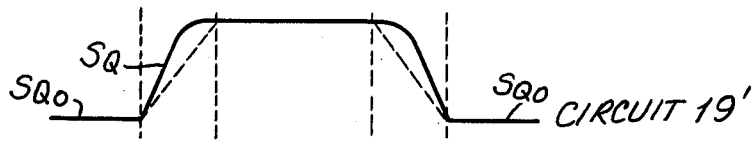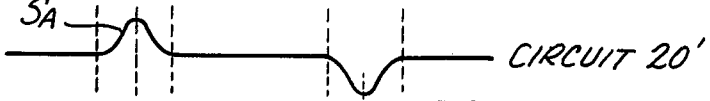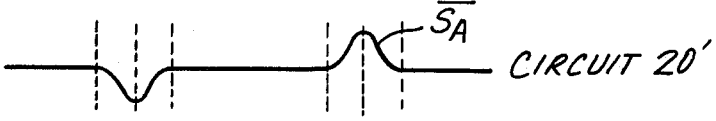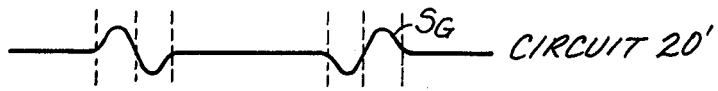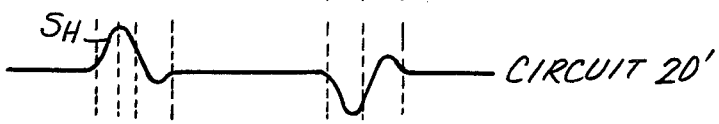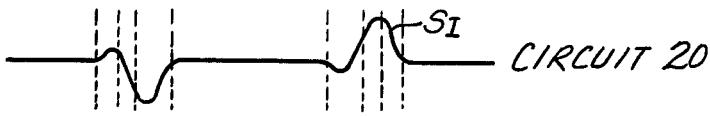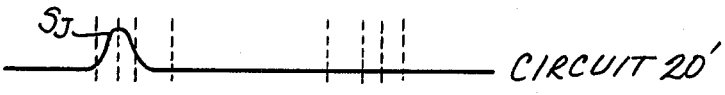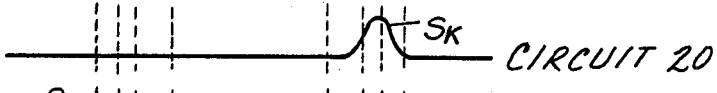

VIDEO SIGNAL REPRODUCING APPARATUS WITH ELECTRON BEAM SCANNING VELOCITY MODULATION

BACKGROUND OF THE INVENTION

1. Field of the Invention

This invention relates generally to video signal reproducing apparatus, such as, television receivers, and more particularly is directed to providing such apparatus with improved arrangements for effecting electron beam scanning velocity modulation so as to significantly enhance the sharpness of the reproduced picture or image.

2. Description of the Prior Art

When the phosphor screen of a video signal reproducing apparatus, such as, the screen of the cathode ray tube in a television receiver, is scanned by an electron beam or beams so as to form a picture or image on the screen, the beam current varies with the luminance or brightness level of the input video signal. Therefore, each electron beam forms on the phosphor screen a beam spot whose size is larger at high brightness levels than at low brightness levels of the image so that sharpness of the reproduced picture is deteriorated, particularly at the demarcation between bright and dark portions or areas of the picture. Further, when a beam scanning the screen in the line-scanning direction moves across the demaraction or edge between dark and bright areas of the picture, for example, black and white areas, respectively, the frequency response of the receiver does not permit the beam intensity to change instantly from the low level characteristic of the black area to the high level characteristic of the white area. Therefore, the sharpness of the reproduced image is degraded at portions of the image where sudden changes in brightness occur in response to transient changes in the luminance or brightness of the video signal being reproduced. The increase in the beam current and in the beam spot size for bright portions of the reproduced picture or image and the inadequate frequency response of the television receiver to sudden changes in the brightness or luminance level of the incomming video signal are additive in respect to the degradation of the horizontal sharpness of the reproduced image or picture.

It has been proposed to compensate for the described degradation of the horizontal sharpness of the picture or image by employing the so-called "aperture correction or compensation technique", for example, as described in "Aperture Compensation for Television Camera", R. C. Dennison, RCA Review, 14,569 (1953). In accordance with such aperture correction or compensation technique, the intensity of the electron beam is first decreased and then increased at those portions of the picture image at which the brightness changes from a low level to a high level. Such modification or compensation of the electron beam intensity can be achieved by twice differentiating the original video signal so as to obtain a compensation signal which is added to the original video signal for obtaining a compensated video signal applied to the cathode of the cathode ray tube and having high level portions with relatively more steeply inclined rising and falling edges. However, with the foregoing aperture compensation technique, the peak luminance or brightness levels of the compensated video signal are increased and, as applied to the cathode of the cathode ray tube, result in beam currents that are increased relative to the maximum beam currents resulting from the original video signal so that the beam spot size is actually increased. By reason of the foregoing, the aperture compensation technique or method is insufficient for achieving really sharp definitions between light and dark areas of the reproduced picture or image, particularly in the case of relatively large screen areas, even though the described technique creates a visual edge effect which, to some extent, and particularly in the case of relatively small screens, registers psychologically as improved edge sharpness.

In order to avoid the above-described disadvantage of the aperture correction or compensation technique, it has been proposed to employ the so-called "beam velocity modulation method or technique" in which transient changes in the brightness level of the video signal are detected, and the scanning velocity of the electron beam in the line-scanning direction is modulated in accordance with the thus detected transient changes, for example, as described in detail in U.S. Pat. No. 2,227,630, No. 2,678,964, No. 3,752,916, No. 3,830,958 and No. 3,936,872, with the last two enumerated patents having a common assignee herewith.

More particularly, in the known beam velocity modulation technique or method, the original video signal representing brightness or luminance of a video picture and which incorporates "dullness" at abrupt changes in the luminance level due to the inadequate frequency response of the television receiver circuits to such abrupt changes in luminance level, is applied directly to the cathode or beam producing means of the cathode ray tube for modulating the intensity of the electron beam or beams, and such original video signal is also differentiated to obtain a modulation signal which is employed for effecting a supplemental horizontal deflection of the beam or beams in addition to the main or usual horizontal deflection thereof. The modulation or compensation signal may be supplied to the main deflection coil or yoke or to a supplemental deflection coil which is in addition to the main deflection coil with the result that the overall magnetic field acting on the beam or beams for effecting horizontal deflection thereof is modulated and corresponding modulation of the beam scanning velocity in the line-scanning direction is achieved. As is well-known, the effect of the foregoing, is to improve the sharpness of the image or picture in the horizontal direction. Since the original video signal is applied directly to the cathode or beam producing means of the cathode ray tube without increasing the level thereof at sharp changes in the brightness level of the video signal, as in the aperture correction or compensation technique, the beam velocity modulation technique does not cause changes in the beam spot size so that sharpness of the image or picture in the horizontal direction is conspicuously improved.

However, it is a characteristic or inherent disadvantage or existing beam velocity modulation arrangements that the improved horizontal sharpness of the reproduced image or picture is achieved at the expense of a reduction in the width of the bright or white areas of the reproduced image or picture so that such bright or white areas are slimmer or more slender than would be the case if the depicted scene were accurately or precisely reproduced.

OBJECTS AND SUMMARY OF THE INVENTION

Accordingly, it is an object of this invention to provide a video signal reproducing apparatus with an improved arrangement for effecting beam scanning velocity modulation and thereby achieving enhanced sharpness of the reproduced image or picture, particularly at the demaractions between relatively dark and light picture areas, without reducing the widths of such light picture areas.

Another object is to provide an arrangement for effecting beam scanning velocity modulation, as aforesaid, which is relatively simple and is readily applicable to video signal reproducing apparatus, such as, television receivers.

In accordance with an aspect of this invention, in a video signal reproducing apparatus having a cathode ray tube in which at least one electron beam is made to scan a screen in line-scanning and vertical directions while the intensity of the beam is modulated to establish the brightness of a video picture to be displayed on the screen, and in which bright picture portions are represented by respective high level portions of an original video signal defined between rising and falling edges extending from low level signal portions representing contiguous relatively dark picture portions; a waveshaping circuit receives the original video signal and acts thereon to provide a compensated video signal in which the width of each high level portion between the respective rising and falling edges is increased, the compensated video signal is employed to control the intensity of the electron beam, the rising and falling edges of each high level portion of the video signal are detected to provide a beam velocity modulation signal with respective positive and negative peaks by which the scanning velocity of the beam in the line-scanning direction is modulated, and the positions of such positive and negative peaks of the beam velocity modulation signal are shifted, relative to the corresponding peaks of a differentiation of the video signal, in the directions toward the adjacent low level signal portions of the compensated video signal.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIGS. 1A and 1B are diagrammatic views representing reproduced video pictures including bright and dark areas;

FIGS. 2A-2D are waveform or graphic views to which reference will be made in explaining the aperture correction or compensation technique of the prior art;

FIGS. 3A-3E are waveform or graphic views to which reference will be made in explaining the beam velocity modulation technique of the prior art and the disadvantage inherent therein;

FIGS. 9A-9L are waveforms to which reference will be made in explaining the operation of the apparatus shown on FIG. 8.

DESCRIPTION OF THE PREFERRED EMBODIMENTS

Figure 4:
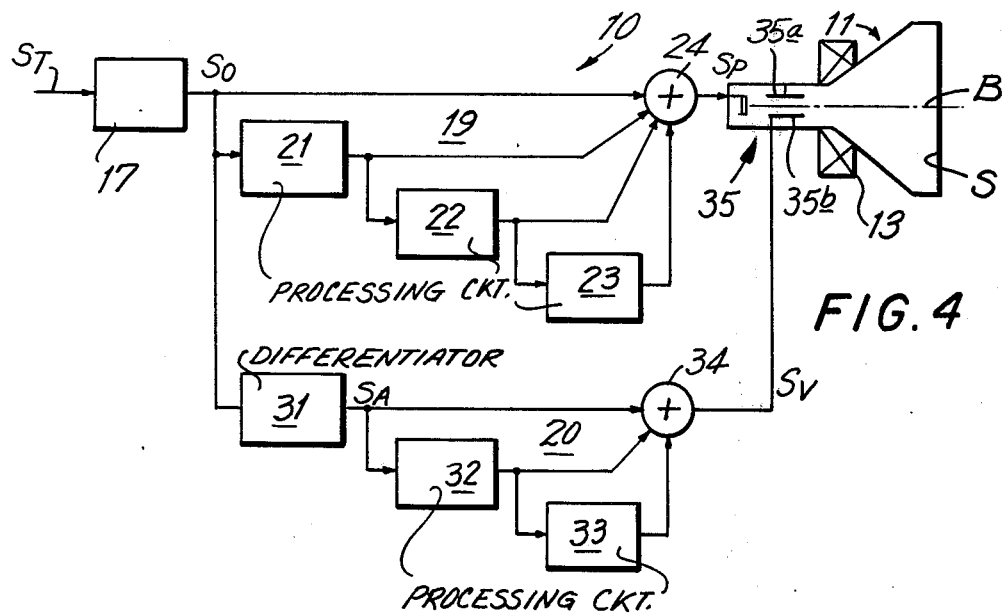
FIG. 4 is a schematic block diagram of a circuit according to an embodiment of the present invention for effecting beam velocity modulation in a video signal reproducing apparatus.

Referring to the drawings in detail, and initially to FIG. 4 thereof, it will be seen that the present invention is related to a television receiver or other video signal reproducing apparatus 10 having a cathode ray tube 11 in which a beam producing means including a cathode 12 directs an electron beam B generally along the axis of the tube envelope toward a phosphor screen S on the faceplate of the tube. In the apparatus 10, the intensity of electron beam B, and hence the brightness of the beam spot produced at the location where the beam B impinges on screen S, is modulated in accordance with a video signal applied to cathode 12 and representing at least the brightness of a video picture to be reproduced on screen S. The cathode ray tube 11 is further shown to include the conventional deflection means or yoke 13 by which beam B is made to scan screen S in the line-scanning or horizontal and vertical directions, respectively. The simultaneous modulation of the beam intensity by the video signal applied to cathode 12 and the scanning of screen S by beam B in response to sweep signals applied to yoke 13 will result in the reproduction of an image or picture on screen S. The image or picture reproduced on screen S may be constituted by at least one white or bright picture portion, for example, in the form of a rectangle as shown at 14$a$ on FIG. 1A, or in the form of a vertical line as indicated at 14$b$ on FIG. 1B, and contiguous relatively darker picture portions 15. In any case, it will be understood that, in each line or horizontal interval of the transmitted video signal $S_T$ received by a television receiver and to be utilized in the cathode ray tube 11 of the latter for reproducing a horizontal increment of an image or picture at a vertical position in the latter which is included in the bright or white area 14$a$ or line 14$b$, the respective bright picture portion is represented by a corresponding high level video signal portion 16$h$ defined between rising and falling edges 16$r$ and 16$f$, respectively, (FIG. 2A). If the transmitted video signal $S_T$ is to represent a white or bright shape or area surrounded by a black or very dark background with a sharp demarcation therebetween, the rising and falling edges 16$r$ and 16$f$ of the high level signal portion 16$h$ will be precipitous, that is, substantially vertical, as shown, so as to represent the desired high frequency change in luminance level. However, the usual television receiver circuit 17 (FIG. 4), for example, comprised of conventional RF and IF amplifiers and a video detector, and by which the video signal $S_O$ to be used in the cathode ray tube is derived from the received television signal $S_T$, has a frequency response that is inadequate to accommodate the mentioned high frequency components of the tramsmitted video signal $S_T$. Thus, the video signal $S_O$ (FIG. 2B) which is available in the television receiver for controlling the intensity of the electron beam or beams in the cathode ray tube is relatively "dull" that is, it has decreased high frequency components, as represented by the illustrated sloping rising and falling edges $16'r$ and $16'f$ of the high level signal portion $16'$. Such relatively dull video signal $S_O$ is hereinafter referred to as the "original video signal", and that terminology is reasonable when considered from the point of view of the input side of the cathode ray tube. Further, the term "original video signal" has often been used in the prior art in the same sense that is is used herein.

The decrease in the high frequency components of the original video signal $S_O$ as compared with the transmitted video signal $S_T$ causes a decrease in the horizontal sharpness of the reproduced image or picture, that is, the sloping, rising and falling edges $16'r$ and $16'f$ (FIG. 2B) result in a gradual change from dark to bright and from bright to dark, respectively, rather than in the sudden changes in brightness represented by the transmitted signal $S_T$ (FIG. 2A). Horizontal sharpness of the reproduced image or picture is furthermore decreased by the fact that, in the cathode ray tube, the electron beam current varies with the luminance or brightness level of the video signal applied to the cathode ray tube and, when the luminance level is high, for example, to represent a bright or white area of the picture, the beam spot size caused by impingement of the electron beam on the phosphor screen is enlarged to further decrease or deteriorate the sharpness of the reproduced picture.

In seeking to compensate for the above-described lack of sharpness of the reproduced picture by the known aperture correction or compensation technique, the original video signal $S_O$ (FIG. 2B) is differentiated twice so as to obtain a compensation signal $S_B$ (FIG. 2C) which is added to the original video signal $S_O$ for providing a compensated video signal $S_C$ (FIG. 2D). As shown, the compensated video signal $S_C$ has rising and falling edges $18r$ and $18f$ which are more steeply inclined than the corresponding rising and falling edges $16'r$ and $16'f$ of the original video signal $S_O$. However, when the compensated video signal $S_C$ is applied to the cathode of a cathode ray tube for controlling the intensity or beam current of the electron beam or beams therein, the sharpness of the reproduced picture is not conspicuously improved. The foregoing results from the fact that, by adding the compensation signal $S_B$ to the original video signal $S_O$ for obtaining the compensated video signal $S_C$ applied to the cathode of the cathode ray tube, the maximum beam current corresponding to the peak luminance level of signal $S_C$ is increased, as compared with the maximum beam current corresponding to the peak luminance level of original video signal $S_O$, with the result that the beam spot size resulting from the compensated video signal $S_C$ is enlarged. Such enlargement of the beam spot size causes a decrease in sharpness of the reproduced picture, as previously noted, and thus substantially defeats any increase in sharpness that might result from the relatively more steeply inclined rising and falling edges $18r$ and $18f$ of the compensated video signal $S_C$.

In the known beam velocity modulation technique for improving horizontal sharpness of the reproduced image or picture, the dull original video signal $S_O$ (FIG. 3A) is applied, without alteration, to the cathode or beam producing means of the cathode ray tube for determining the intensity or beam current of the electron beam or beams in the cathode ray tube. The original video signal $S_O$ is also subjected to differentiation to obtain a compensated or differentiated signal $S_A$ (FIG. 3B). The compensation signal $S_A$ is applied to a supplemental deflection means which is in addition to the main deflection coils or yoke so that the horizontal deflection field for effecting scanning movement of each beam in the line-scanning direction is modified or compensated, as shown on FIG. 3C. As a result of such modified or compensated horizontal deflection field, the beam scanning velocity in the line-scanning direction, is modulated as shown on FIG. 3D. It will be appreciated that, during each period $T_a$ on FIG. 3D, the beam scanning velocity is increased so that a decreased amount of light is emitted from the phosphor dots or areas on the screen that are impinged upon during each period $T_a$. On the other hand, during each period $T_b$, the beam velocity is decreased so that an increased amount of light is emitted from the phosphor dots or areas impinged upon by the electron beam during each period $T_b$. Therefore, the variation along a line, or in the horizontal direction across the screen, in the amount of emitted light, is substantially as indicated on FIG. 3E, from which it will be apparent that the sharpness of the reproduced image or picture in the horizontal direction is improved. Since the original video signal $S_O$ is still applied to the cathode of the cathode ray tube for controlling the beam intensity, the beam spot size is not changed or increased by reason of the beam velocity modulation and, therefore, the improvement in sharpness in the horizontal direction is not adversely affected by increasing beam spot size, as in the aperture correction or compensation technique. However, the conventional beam velocity modulation technique has the disadvantage that the width of each white or bright portion of the picture or image reproduced on the screen is less than that which would result from the original video signal $S_O$ in the absence of the beam velocity modulation, as is apparent from a comparison of FIG. 3E with FIG. 3A.

Generally, in order to avoid the foregoing disadvantage of the previously known beam velocity modulation technique, the video signal reproducing apparatus 10 according to the present invention employs a waveshaping circuit 19 receiving the original video signal $S_o$ from circuit 17 and providing a corresponding compensated video signal $S_P$ in which the width of each high level signal portion is increased relative to the corresponding width of the original video signal. The compensated video signal $S_P$ from waveshaping circuit 19 is applied to the cathode 12 or beam reproducing means of the cathode ray tube 11 for modulating the intensity of the electron beam or beams therein in accordance with the compensated video signal $S_P$, while the rising and falling edges of each high level signal portion of the video signal $S_O$ are detected in a beam velocity modulation control circuit 20 to provide a beam velocity modulating signal $S_V$ with respective positive and negative peaks by which the horizontal scanning velocity of the electron beam B or beams is modulated, and with the positions of such positive and negative peaks of signal $S_V$ being shifted, relative to the corresponding peaks of a mere differentiation of the video signal, in the directions toward the adjacent low level signal portions of the compensated video signal.

As shown on FIG. 4, the waveshaping circuit 19 may include a number of signal processing circuits 21, 22 and 23 connected in cascade, and an adding circuit 24 by which outputs of signal processing circuits 21, 22 and 23 are added to the original video signal $S_O$ from circuit 17 for providing the compensated video signal $S_P$. The signal processing circuits 21, 22 and 23 include at least respective differentiating circuits for effecting successively higher order differentiations of the original video signal. Thus, for example, the three signal processing circuits 21, 22 and 23 included in waveshaping circuit 19 on FIG. 4 may effect first, quadratic and cubic differentiations, respectively, of original video signal $S_O$. Each of signal processing circuits 21, 22 and 23 may further include a polarity selector for passing to adding circuit 24 only the positive portions or peaks of the respective differentiated signal corresponding to the rising and falling edges of the original video signal $S_O$. A level controller also may be provided in each of circuits 21-23 for suitably adjusting the level of the positive peaks of the respective differentiated signal, as applied to adding circuit 24, so that the aggregate of the original video signal $S_O$ and of the outputs of signal processing circuits 21-23 will provide the compensated video signal $S_P$ with the desired increased width of each of its high level signal portions.

Figure 7:
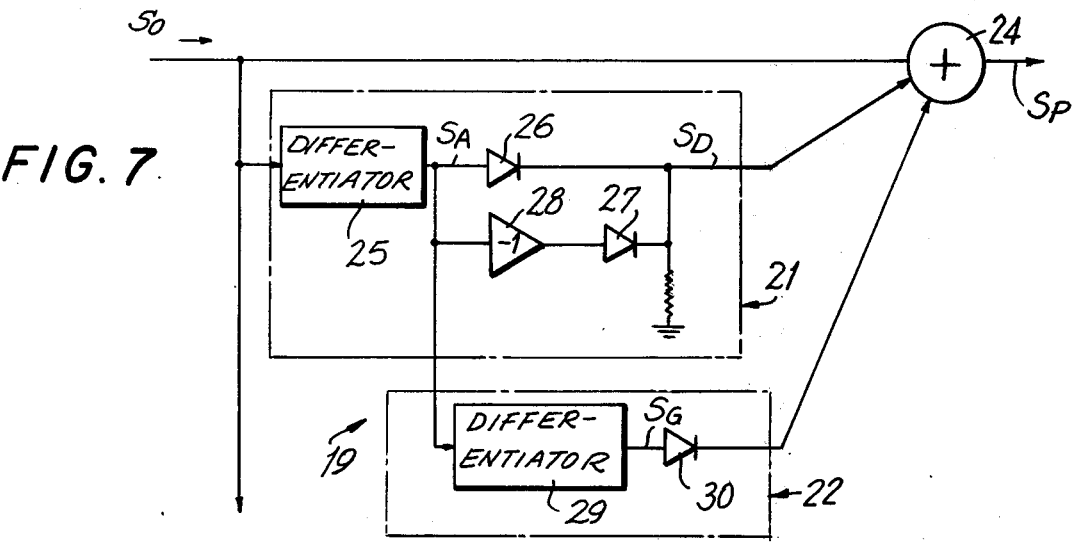
FIG. 7 shows in greater detail circuit arrangements that may be employed to constitute some of the components of the apparatus appearing on FIG. 4.

As shown on FIG. 7, by way of example, signal processing circuit 21 may include a differentiating circuit 25 receiving original video signal $S_O$ and providing a differentiated signal $S_A$ (FIG. 9B) having positive and negative peaks corresponding to the rising and falling edges, respectively, of a high level portion of video signal $S_O$ (FIG. 9A). The polarity selector of signal processing circuit 21 is shown to include a first diode 26 connected in parallel with a series circuit of a second diode 27 and an inverter 28 so that each positive peak of differentiated signal $S_A$ passes through diode 26 and each negative peak of signal $S_A$, after being inverted in inverter 28 to provide a corresponding positive peak, passes through diode 27. As a result of the foregoing, the output of circuit 21 is a differentiated signal $S_D$ of one polarity (FIG. 9C), that is, having peaks only of positive polarity corresponding to both the rising and falling edges, respectively, of each high level portion original video signal $S_O$. Further, in the example of FIG. 7, signal processing circuit 22 is shown to include a differentiating circuit 29 receiving the differentiated signal $S_A$ from differentiating circuit 25 and providing a quadratic differentiated signal $S_G$ (FIG. 9G). Such quadratic differentiated signal $S_G$ is applied to a diode 30 so that only the positive peaks thereof are passed to adding circuit 24. The addition of the positive peaks of differentiated signals $S_A$ and $S_G$ to original video signal $S_O$ has the effect of increasing the width of each high level signal portion of compensated video signal $S_P$, as previously noted. As the number of signal processing circuits, and hence the number of successively higher order differentiations of the original video signal $S_O$, is increased, for example, to three signal processing circuits, as at 21-23 on FIG. 4, or to even a larger number, the increase in the width of the high level signal portion is correspondingly enhanced.

Returning now to FIG. 4, it will be seen that the beam velocity modulation control circuit 20 is there shown to include a differentiating circuit 31 also receiving the original video signal $S_O$ from circuit 17 so as to provide the differentiated signal $S_A$, a number of signal processing circuits 32 and 33 connected in cascade, and an adding circuit 34 by which the outputs of signal processing circuits 32 and 33 are added to the differentiated signal $S_A$ from circuit 31 for providing the beam velocity modulating signal $S_V$. Such beam velocity modulation signal $S_V$ is applied to a beam deflection means of cathode ray tube 11, for example, to a supplemental deflection device 35 provided in addition to the usual yoke 13, for modulating the scanning velocity of the electron beam B in the line-scanning direction in accordance with the signal $S_V$. The supplemental deflection device 35 may be constituted, as shown, by two spaced apart plate-like electrodes 35a and 35b directed vertically in cathode ray tube 11 and arranged for the passage of electron beam B therebetween. Thus, application of signal $S_V$ across plate-like electrodes 35a and 35b produces a corresponding electrical field therebetween by which the scanning velocity of the beam, that is, its rate of horizontal movement across the screen, is modulated. Such modulation of the scanning velocity causes a corresponding modulation of the change of horizontal position of the beam with time, for example, as represented by the curve 36 on FIG. 5.

The signal processing circuits 32 and 33 include at least respective differentiating circuits for effecting successively higher order differentiations of the differentiated signal $S_A$ from circuit 31. Thus, for example, signal processing circuits 32 and 33 may effect quadratic and cubic differentiations, respectively, of original video signal $S_O$, and such processing circuits may further include repective polarity selectors so that the peaks of the respective differentiated signals which are applied to adding circuit 34 will be effective in the latter to shift the positions of the maximum amplitudes of the positive and negative peaks of signal $S_V$ in the directions toward the adjacent low level signal portions of the compensated video signal $S_P$, as shown on FIG. 5.

Figure 5:
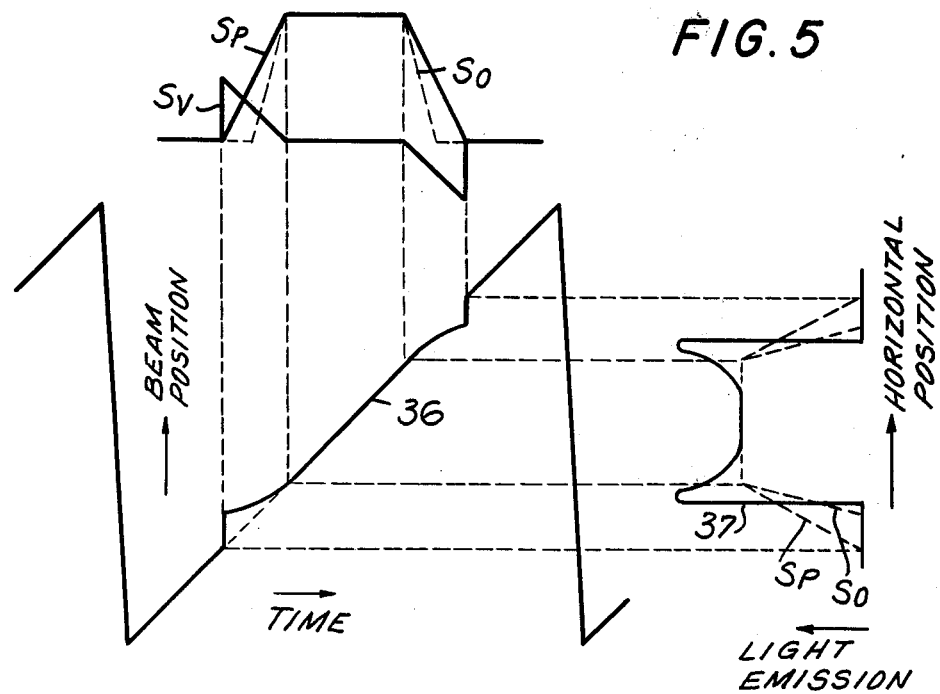
FIGS. 5 and 6 are graphic views to which reference will be made in explaining the operation of the apparatus of FIG. 4.

As a result of the shifting of the positions of the maximum amplitudes of the positive and negative peaks of signal $S_V$, the change in the horizontal position of the beam on the screen with the lapse of time is represented by the curve or line 36 on FIG. 5, and the intensity of light emission is changed or varied in the horizontal direction across the screen in the manner represented by the line 37 on FIG. 5, as hereinafter described in detail.

Figure 6:
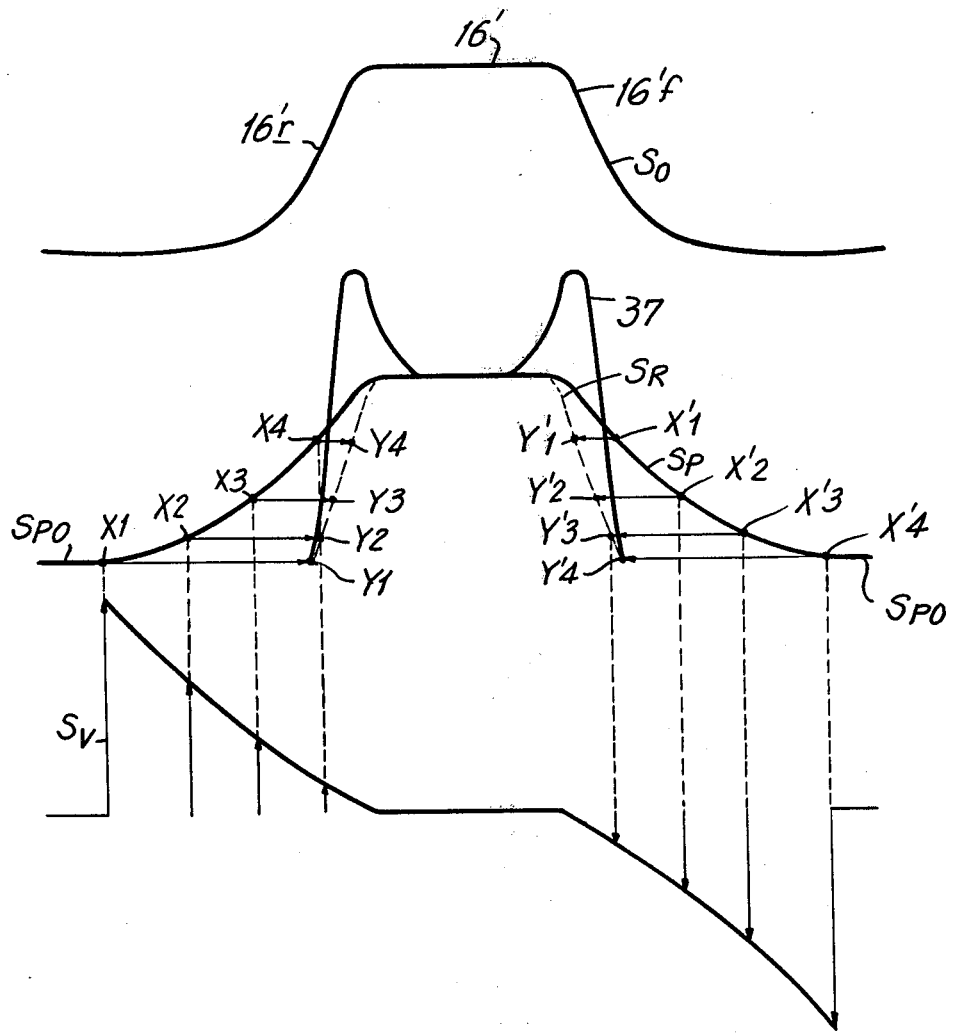

More particularly, and as shown on FIG. 6, when the beam velocity modulation signal $S_V$ has the maximum amplitudes of its positive and negative peaks shifted in the directions toward the low level signal portions $S_{P_O}$ of compensated video signal $S_P$ in accordance with the present invention, for example, when the maximum amplitudes of the positive and negative peaks are substantially at the commencement and conclusion, respectively, thereof, as shown on FIG. 6, then, at the time when the beam is disposed at the position $X_1$ where the compensated video signal $S_P$ begins to rise from its low level $S_{P_O}$, the beam velocity modulation signal $S_V$ substantially instantaneously rises to its maximum amplitude so as to cause sharp acceleration of the beam and almost instantaneous displacement of the beam from the position $X_1$ to the position $Y_1$. By reason of the almost instantaneous displacement or movement of the beam from position $X_1$ to position $Y_1$, the emission of light from the screen between the positions $X_1$ and $Y_1$ is nearly totally suppressed. As the level of the positive peak of signal $S_V$ gradually decreases from the initial maximum value, the horizontal beam movement is decelerated at a decreasing rate toward the usual beam scanning velocity determined by the deflection yoke 13. Thus, at times when the electron beam would normally be disposed at positions $X_2$, $X_3$ and $X_4$, the beam velocity modulation signal $S_V$ is effective in deflection device 35 to dispose the beam at the positions $Y_2$, $Y_3$ and $Y_4$, respectively. Conversely, during times corresponding to the falling edge of the compensated video signal $S_P$, the beam undergoes a gradually increasing deceleration from its normal beam scanning velocity and then a sudden acceleration as a result of the negative peak of signal $S_V$. Thus, at times when the beam would otherwise occupy the positions $X'_1$, $X'_2$, $X'_3$ and $X'_4$, the beam is disposed at the positions $Y'_1$, $Y'_2$, $Y'_3$ and $Y'_4$, respectively. Further, the beam will move almost instantaneously from the position $Y'_4$ to the position $X'_4$ at the completion of the negative peak of signal $S_V$ so as to almost completely suppress the emission of light between the positions $Y'_4$ and $X'_4$. Therefore, when compensated video signal $S_P$ is applied to cathode 12 of cathode ray tube 11 for modulating the intensity or density of electron beam B and the signal $S_V$ employed for modulating the beam scanning velocity has the maximum amplitudes of its positive and negative peaks shifted toward the low level signal portions $S_{P_0}$ of compensated video signal $S_P$ in accordance with this invention, the effect is equivalent to that of applying to cathode 12 a video signal $S_R$ indicated in dotted lines on FIG. 6 in the absence of any beam scanning velocity modulation. It will be apparent that such equivalent video signal $S_R$ has relatively sharp or steep rising and falling edges. Furthermore, it will be apparent that the electron beam moves relatively slowly between the positions $Y_1$ and $Y_4$ and between the positions $Y'_1$ and $Y'_4$ so that, at the corresponding beam positions on the screen, the amount of light emission therefrom is correspondingly increased, as indicated by the curve 37 on FIG. 6.

A comparison of the original video signal $S_O$ with the curve 37 on FIG. 6 will show that, in a video signal reproducing apparatus according to this invention, the sharpness of the reproduced picture or image is improved and the width of the white or bright portion of the image or picture corresponds generally to the width of the respective high level portion 16' of original video signal $S_O$ measured between the mid-points of the rising and falling edges 16'r and 16'f of such high level portion. Thus, the disadvantageous narrowing of the white or bright portion of the reproduced picture or image which is characteristic of the previously known beam scanning velocity modulation, and which has been described with reference to FIGS. 3A–3E, is avoided in accordance with this invention.

In the velocity modulation control circuit 20 shown on FIG. 4, two signal processing circuits are provided to effect the successively higher order differentiations of the differentiated signal $S_A$ from circuit. However, the number of such signal processing circuits in circuit 20 may be increased, and it is to be understood that the number of successively higher order differentiations thus effected for addition to signal $S_A$ determines the steepness of the rising edges of the positive and negative peaks of resulting signal $S_V$, that is, the extent to which the positions of the maximum amplitudes of the positive and negative peaks of signal $S_V$ are shifted toward the low signal level portions of signal $S_P$.

In the embodiment of this invention illustrated schematically by FIG. 4, the waveshaping circuit 19 and beam velocity modulation control circuit 20 each include a member of singal processing circuits for effecting respective multidimensional differentiations so that the circuits 19 and 20 are rather complicated. However, the present invention may also be embodied in a relatively simplified apparatus 10' which will be hereinafter described in detail with reference to FIG. 8, and in which parts corresponding to parts previously described with reference to FIG. 4 or FIG. 7 are identified by the same reference numerals.

More particularly, in the apparatus 10', the waveshaping circuit 19' consists of a circuit arrangement which is similar to that of the signal processing circuit 21 on FIG. 7. Thus, waveshaping circuit 19' is shown to consist of a differentiating circuit 25 receiving the original video signal $S_O$ (FIG. 9A) and providing a differentiated signal $S_A$ (FIG. 9B) having positive and negative peaks corresponding to the rising and falling edges 16'r and 16'f, respectively, of a high level portion 16' of video signal $s_O$, and a ploarity selector formed by a diode 26 connected in parallel with a series circuit of a second diode 27 and an inverter 28 so that a differentiated signal $S_D$ of one polarity (FIG. 9C), that is, having peaks only of positive polarity, is applied to adding circuit 24 for addition in the latter to original video signal $S_O$. As a result of the foregoing, the output of adding circuit 24 provides a compensated video signal $S_Q$ (FIG. 9D) which is applied to cathode 12 of cathode ray tube 11, and in which the width of each high level signal portion is substantially increased as compared with the corresponding high level signal portion 16' in the original video signal $S_O$.

In the apparatus 10', the beam velocity modulation control circuit 20' includes a differentiating circuit 31 which receives the original video signal $S_O$ from circuit 17 so as to again provide the differentiated signal $S_A$ (FIG. 9E). Such signal $S_A$ is supplied to an inverter 38 to obtain an inverted differentiated signal $\overline{S}_A$ (FIG. 9F). The differentiated signal $S_A$ is further supplied from circuit 31 to a differentiating circuit 39 for obtaining a quadratic differentiated signal $S_G$ (FIG. 9G). The first differentiated signal $\overline{S}_A$ and the quadratic differentiated signal $S_G$ are added to each other in an adding circuit 40 so as to obtain an output signal $S_H$ (FIG. 9H) in which the positions of the maximum amplitudes of the major positive and negative peaks are advanced in respect to the positions of the maximum values of the positive and negative peaks of the differentiated signal $\overline{S}_A$. Similarly, the inverted differentiated signal $S_A$ and the quadratic differentiated signal $S_G$ are added to each other in an adding circuit 41 so as to obtain an output signal $S_I$ (FIG. 9I) in which the positions of the maximum amplitudes of the major negative and positive peaks are delayed as compared with the positions of the maximum values of the negative and positive peaks of the signal $S_A$. The signal $S_H$ from adding circuit 40 is applied to a B-class amplifier 42 so as to obtain from the latter a positive-going signal $S_J$ (FIG. 9J), corresponding to the major positive peak of the signal $S_H$ occurring simultaneously with the rising of compensated video signal $S_Q$. Similarly, the signals $S_I$ from adding circuit 41 is applied to a B-class amplifier 43 so as to obtain from the latter a positive-going signal $S_K$ (FIG. 9J) corresponding to the major positive peak of signal $S_I$ occurring simultaneously with the falling of compensated video signal $S_Q$. The signals $S_J$ and $S_K$ are applied from amplifiers 42 and 43 to plate-like electrodes 35a and 35b, respectively, of the supplemental deflecting device 35. Thus, a subtractive or difference signal $S_L$ (FIG. 9L) equal to the difference between the signals $S_J$ and $S_K$ is applied between electrodes 35a and 35b so as to produce a corresponding electrostatic field by which electron beam B is deflected for achieving beam scanning velocity modulation.

It will be noted that the beam velocity modulation signal $S_L$ has the positions of the maximum amplitudes of its positive and negative peaks shifted in the directions toward the low level signal portions $S_{Q_0}$ of the compensated video signal $S_Q$ (FIG. 9D) as compared with the positions of the maximum amplitudes of the positive and negative peaks of differentiated signal $S_A$. By reason of the foregoing, the beam velocity modulation effected in response to the signal $S_L$ achieves improved sharpness of the reproduced image or picture while avoiding narrowing of the white or bright picture or image portions.

Figure 8:
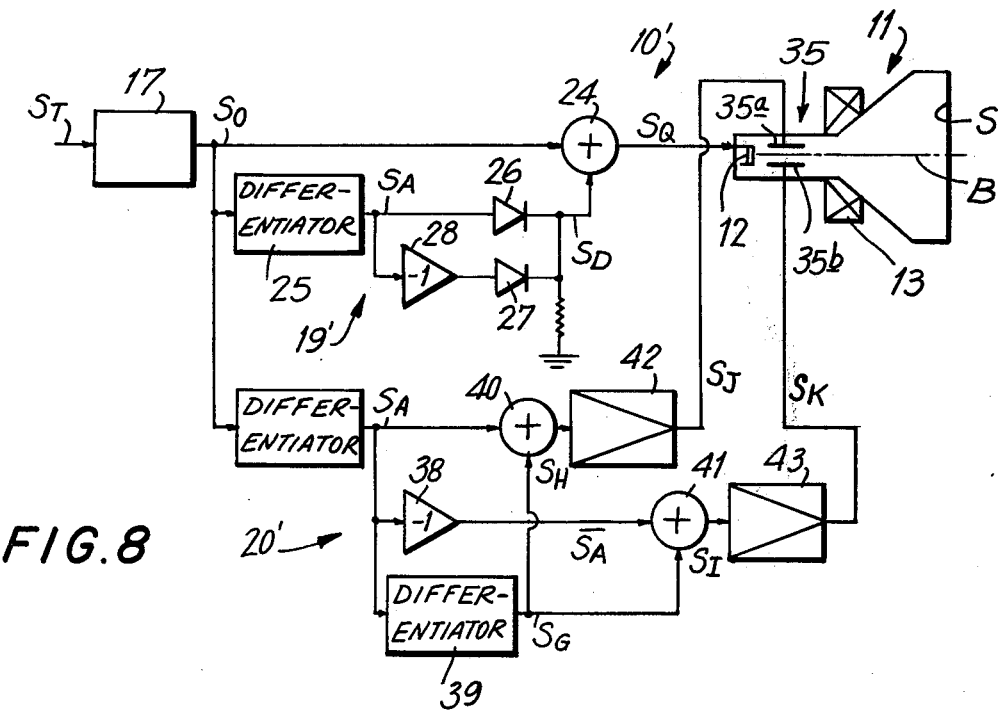
FIG. 8 is a view similar to that of FIG. 4, but showing another embodiment of this invention.

Although the beam velocity modulation signal $S_V$ or $S_L$ is shown, in the previously described embodiments of FIGS. 4 and 8, to be applied between the plate-like electrodes 35a and 35b of supplemental deflection device 35, the present invention may be advantageously employed in connection with a cathode ray tube of the type disclosed in detail in U.S. Pat. No. 3,936,872, and in which an electron gun is provided with a special focusing electrode to also function as the beam deflection means for modulating the scanning velocity of the electron beam in the line-scanning direction. More particularly, as shown on FIG. 10, the electron gun provided in the neck portion 44 of a cathode ray tube 11A may include a cathode 12A, a control electrode or grid 45, an acceleration electrode or grid 46, a first anode electrode 47, a focusing electrode 48 and a second anode electrode 49 all arranged successively in axial alignment along the central axis 50 of the cathode ray tube. The focusing electrode 48 is shown to be tubular and to be formed in two parts 48a and 48b which are axially separated along a vertical plane inclined relative to the axis 50 of the cathode ray tube. For the operation of the electron gun structure shown on FIG. 10, appropriate static or bias voltages are applied to grids 45 and 46 and to electrodes 47, 48 and 49. Thus, for example, a voltage of zero to $-400$ V. may be applied to grid 45, a voltage of zero to 500 V. may be applied to grid 46, a relatively high voltage or potential, for example, an anode voltage of 13 to 20 KV. may be applied to electrodes 47 and 49, and a relatively low voltage or potential of zero to only several KV. may be applied to parts 48a and 48b of electrode 48, with all of the foregoing voltages being relative to the bias voltage applied to cathode 12A as a reference potential. With the foregoing bias voltage distribution, an electron lens field is established around the axis of electrode 48 by the electrodes 47, 48 and 49 to form a main focusing lens by which the electron beam is focused at the screen of the cathode ray tube. Furthermore, the beam velocity modulation signal $S_V$ or $S_L$ according to this invention may be applied between parts 48a and 48b of electrode 48 in superposed relation to the static or bias voltage applied to electrode 48 for forming the focusing lens. It will be apparent that, by reason of the described diagonal separation between parts 48a and 48b of focusing lens electrode 48, the application of the beam velocity modulation signal $S_V$ or $S_L$ between electrode parts 48a and 48b will result in a respective electrostatic field which is operative to deflect the electron beam or beams in the horizontal or line-scanning direction so as to modulate the line-scanning velocity in the same manner as when such signal $S_V$ or $S_L$ is applied to deflecting device 35.

Figure 10:
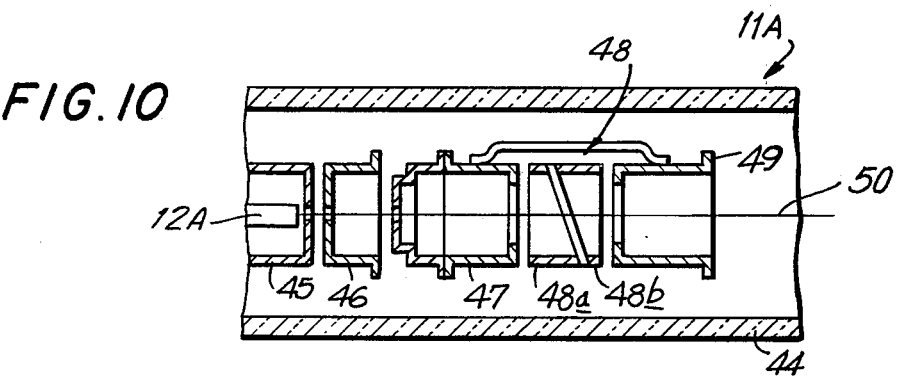
FIG. 10 is an axial sectional view of an electron gun in a cathode ray tube which is particularly suited for use with a beam velocity modulation arrangement according to this invention.

It is also to be noted that, in a video signal reproducing apparatus according to this invention, the beam velocity modulation signal $S_V$ or $S_L$ may be simply superimposed on the horizontal deflection signal which is applied to the horizontal deflection coil of main deflection yoke 13 so as to again modulate the beam scanning velocity in the line-scanning direction without requiring either the supplemental deflection device 35 of FIGS. 4 and 8 or the two-part focusing lens electrode 48 of FIG. 10.

Further, in all of the above, the invention has been illustrated and described as applied to a monochrome television receiver for modulating the beam scanning velocity of a single electron beam. However, it will be understood that the invention is similarly applicable to a color television receiver in which the luminance component of the color television signal is the so-called original video signal $S_O$ subjected to the action of the waveshaping circuit 19 or 19' and also to the action of the beam velocity modulation control circuit 20 or 20'.

In any event, it will be apparent that, in a television receiver or other video signal reproducing apparatus according to this invention, the sharpness of the reproduced image or picture is very substantially improved without decreasing the width of relatively bright or white areas of the reproduced picture, and that such advantageous result is achieved by providing a compensated video signal $S_P$ or $S_Q$ for modulating the intensity or density of each electron beam, and further by selectively modifying the waveform of the beam velocity modulation signal $S_V$ or $S_L$ employed for effecting beam scanning velocity modulation.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A video signal reproducing apparatus comprising:
   a source of a video signal representing at least the brightness of a video picture and in which bright picture portions are each represented by a video signal portion of high level defined between respective rising and falling edges extending from low level signal portions representing relatively dark picture portions contiguous to the bright picture portion;
   waveshaping means receiving said video signal from said source for providing a corresponding compensated video signal in which the width of each of said high level signal portions between said respective rising and falling edges is increased;
   a cathode ray tube having a screen, an electron gun including beam producing means directing an electron beam generally along the axis of the tube toward said screen for impingement on the latter and being controlled in response to said compensated video signal from said waveshaping means so that the intensity of the beam is modulated in accordance with said compensated video signal, and means for causing said beam to scan said screen in line-scanning and vertical directions, respectively;
   beam velocity modulation control means connected with said source of the video signal for providing therefrom a beam velocity modulation signal having positive and negative peaks in correspondence to said rising and falling edges of each of said high level signal portions with the positions of said positive and negative peaks being shifted, relative to the corresponding peaks of a differentiation of said video signal, in the directions toward the adjacent low level signal portions of said compensated video signal; and beam deflection means for modulating the scanning velocity of said electron beam in said line-scanning direction in accordance with said beam velocity modulation signal.

2. A video signal reproducing apparatus according to claim 1; in which said waveshaping means comprises at least one signal processing circuit including differentiating means for differentiating the video signal from said source of the latter, polarity equalizing means acting on the differentiated signal from said differentiating means for providing a differentiated signal of one polarity, and adder means adding the video signal from said source thereof and said differentiated signal of one polarity to provide said compensated video signal.

3. A video signal reproducing apparatus according to claim 2; in which said polarity equalizer includes a first diode connected in parallel with a series connection of an inverter and a second diode.

4. A video signal reproducing apparatus according to claim 2; in which said waveshaping means further comprises a second signal processing circuit including second differentiating means for differentiating said differentiated signal from the first mentioned differentiating means, and unidirectional means connected with said second differentiating means for applying to said adder means the output of said second differentiating means which is of said one polarity.

5. A video signal reproducing apparatus according to claim 2; in which said beam velocity modulation control means comprises a main differentiation circuit acting on said video signal from said source to provide a main differentiated output with positive and negative peaks corresponding to said rising and falling edges of the video signal from said source, an additional differentiating circuit acting on said main differentiated output to provide a quadratic differentiated output, inverting means receiving said main differentiated output to provide an inverted differentiated output, a first adder adding said quadratic differentiated output to said main differentiated output, and a second adder adding said quadratic differentiated output to said inverted differentiated output; and said first and second adders are connected with said beam deflection means so as to derive said beam velocity modulation signal as the difference between outputs of said first and second adders.

6. A video signal reproducing apparatus according to claim 5; in which said beam deflection means includes two spaced apart plate-like electrodes directed vertically in the cathode ray tube and between which said electron beam passes, and means for applying said outputs from the first and second adders to said plate-like electrodes, respectively.

7. A video signal reproducing apparatus according to claim 1; in which said beam deflection means includes two spaced apart plate-like electrodes directed vertically in the cathode ray tube and between which said electron beam passes, and means for applying said beam velocity modulation signal across said plate-like electrodes.

8. A video signal reproducing apparatus according to claim 1; in which said beam deflection means includes a tubular electrode on said axis of the tube for the passage of said electron beam axially through said tubular electrode between said beam producing means and said screen, said tubular electrode being in two parts which are axially separated along a vertical plane that is inclined relative to said axis of the tube, and means for applying said beam velocity modulation signal across said two parts of the tubular electrode.

9. A video signal reproducing apparatus according to claim 8; in which said tubular electrode is included in electron lens means for focusing said beam at said screen, and said electron lens means further includes at least another tubular electrode arranged coaxially in respect to the first mentioned tubular electrode, with a relatively low potential being applied to said first tubular electrode and a relatively high potential being applied to said other electrode for producing an electrical field which effects said focusing of the beam.

10. A video signal reproducing apparatus according to claim 1; in which said waveshaping means comprises n signal processing circuits connected in cascade and each including a respective differentiating means, n being a positive integer, and adder means for adding to said video signal from said source thereof respective differentiated outputs from said n signal processing circuits so as to derive therefrom said compensated video signal.

11. A video signal reproducing apparatus according to claim 10; in which said beam velocity modulation control means comprises a main differentiating circuit, m signal processing circuits connected in cascade and each including a respective differentiating means, m being a positive integer, and adder means for adding respective differentiated outputs from said main differentiating circuit and from each of said m signal processing circuits so as to derive therefrom said beam velocity modulation signal.

12. A video signal reproducing apparatus according to claim 11; in which said main differentiating circuit provides a main differentiated output with positive and negative peaks corresponding to said rising and falling edges of the video signal from said source; m is one to provide one respective signal processing circuit; said one signal processing circuit has said differentiating means thereof acting on said main differentiated output to provide a quadratic differentiated output, and further includes inverting means receiving said main differentiated output to provide an inverted differentiated output; said adder means of the beam velocity modulation control means includes a first adder adding said quadratic differentiated output to said main differentiated output and a second adder adding said quadratic differentiated output to said inverted differentiated output; and said first and second adders are connected with said beam deflection means so that said beam velocity modulation signal is derived as the difference between outputs of said first and second adders.

13. A video signal reproducing apparatus according to claim 10; in which one of said n signal processing circuits includes polarity equalizing means acting on the output of the respective differentiating means for providing a differentiated signal of one polarity applied to said adder means for addition to said video signal from said source.

14. A video signal reproducing apparatus according to claim 1; in which said beam velocity modulation control means comprises a main differentiating circuit, m signal processing circuits connected in cascade and each including a respective differentiating means, m being a positive integer, and adder means for adding respective differentiated outputs from said main differentiating circuit and from each of said m signal processing circuits so as to derive therefrom said beam velocity modulation signal.

15. A video signal reproducing apparatus according to claim 14; in which sad main differentiating circuit provides a main differentiated output with positive and negative peaks corresponding to said rising and falling edges of the video signal from said source; m is one to provide one respective signal processing circuit; said one signal processing circuit has said differentiating means thereof acting on said main differentiated output to provide a quadratic differentiated output, and further includes inverting means receiving said main differentiated output to provide an inverted differentiated output; said adder means of the beam velocity modulation control means includes a first adder adding said quadratic differentiated output to said main differentiated output and a second adder adding said quadratic differentiated output to said inverted differentiated output; and said first and second adders are connected with said beam deflection means so that said beam velocity modulation signal is derived as the difference between outputs of said first and second adders.

* * * * *